(12) United States Patent
Liu

(10) Patent No.: US 11,733,670 B2
(45) Date of Patent: Aug. 22, 2023

(54) INFORMATION PROCESSING DEVICE AND INFORMATION PROCESSING METHOD

(71) Applicant: FANUC CORPORATION, Minamitsuru-gun (JP)

(72) Inventor: Sichen Liu, Yamanashi-ken (JP)

(73) Assignee: FANUC CORPORATION, Yamanashi-Ken (JP)

( * ) Notice: Subject to any disclaimer, the term of this patent is extended or adjusted under 35 U.S.C. 154(b) by 238 days.

(21) Appl. No.: 16/799,514

(22) Filed: Feb. 24, 2020

(65) Prior Publication Data
US 2020/0278655 A1 Sep. 3, 2020

(30) Foreign Application Priority Data

Feb. 28, 2019 (JP) .................. 2019-035551

(51) Int. Cl.
G05B 19/19 (2006.01)

(52) U.S. Cl.
CPC .... G05B 19/19 (2013.01); *G05B 2219/35312* (2013.01)

(58) Field of Classification Search
CPC .......... G05B 19/19; G05B 2219/35312; G05B 2219/37559; G05B 2219/35326; B23Q 17/2409
See application file for complete search history.

(56) References Cited

U.S. PATENT DOCUMENTS

| | | |
|---|---|---|
| 6,128,547 A | 10/2000 | Tomoeda et al. |
| 6,338,003 B1 | 1/2002 | Kamiguchi et al. |
| 6,678,568 B1 * | 1/2004 | Yamada .................. G06T 17/00 700/145 |
| 9,409,272 B2 * | 8/2016 | Tezuka ................... H04N 13/30 |
| 2010/0063615 A1 * | 3/2010 | Mori ..................... G05B 19/406 700/160 |

(Continued)

FOREIGN PATENT DOCUMENTS

| | | |
|---|---|---|
| JP | H05-027819 A | 2/1993 |
| JP | H8-106317 A | 4/1996 |

(Continued)

OTHER PUBLICATIONS

Hidenori Taketomi, Machine translation of JP-2011154436-A (Year: 2011).*

(Continued)

*Primary Examiner* — Jason Lin
(74) *Attorney, Agent, or Firm* — McGinn I.P. Law Group, PLLC

(57) ABSTRACT

An information processing device is connected to a measurement device provided in the vicinity of a machine tool for machining a workpiece using a tool and a numerical control device configured to control the machine tool. The information processing device includes: a display unit configured to display information; a first acquisition unit configured to acquire, from the measurement device, measurement information measured by the measurement device; a second acquisition unit configured to acquire, from the numerical control device, state information indicating a state of the machine tool; and a display control unit configured to cause the display unit to display the measurement information and the state information.

5 Claims, 10 Drawing Sheets

(56) References Cited

U.S. PATENT DOCUMENTS

| | | | | |
|---|---|---|---|---|
| 2010/0119146 | A1* | 5/2010 | Inazumi | G06T 5/003 |
| | | | | 382/153 |
| 2011/0128367 | A1* | 6/2011 | Yoshioka | G06T 3/40 |
| | | | | 715/800 |
| 2012/0019629 | A1* | 1/2012 | Nagano | H04N 21/435 |
| | | | | 348/51 |
| 2012/0163930 | A1* | 6/2012 | Jeyaraman | B23Q 17/2409 |
| | | | | 408/8 |
| 2012/0265330 | A1* | 10/2012 | Beck | G05B 19/409 |
| | | | | 700/95 |
| 2012/0296463 | A1* | 11/2012 | Rivers | B23Q 9/0042 |
| | | | | 700/114 |
| 2013/0218322 | A1* | 8/2013 | Carli | B23Q 1/0045 |
| | | | | 700/180 |
| 2014/0233839 | A1* | 8/2014 | Morita | G06T 7/564 |
| | | | | 382/141 |
| 2015/0229835 | A1* | 8/2015 | Takahashi | H04N 5/23216 |
| | | | | 348/239 |
| 2016/0001445 | A1* | 1/2016 | Setsuda | B25J 9/1633 |
| | | | | 700/260 |
| 2016/0320772 | A1* | 11/2016 | Ono | G05B 19/4068 |
| 2016/0334777 | A1* | 11/2016 | Sato | B23Q 17/0909 |
| 2017/0308055 | A1* | 10/2017 | Hoshino | G05B 19/409 |
| 2018/0107192 | A1* | 4/2018 | Endo | G05B 19/401 |
| 2019/0061088 | A1* | 2/2019 | Ootou | G05B 19/402 |

FOREIGN PATENT DOCUMENTS

| | | | | |
|---|---|---|---|---|
| JP | H09-244728 A | | 9/1997 | |
| JP | H10-166242 A | | 6/1998 | |
| JP | H11-201738 A | | 7/1999 | |
| JP | 2004-191856 A | | 7/2004 | |
| JP | 2011154436 A | * | 8/2011 | ......... B23Q 17/2409 |
| JP | 2012093262 A | * | 5/2012 | ........... B23Q 17/249 |
| JP | 2016-132039 A | | 7/2016 | |
| JP | 2016128182 A | * | 7/2016 | |
| JP | 2018-094689 A | | 6/2018 | |
| JP | 2019-040499 A | | 3/2019 | |
| JP | 2020-140447 A | | 9/2020 | |
| JP | 2020-140448 A | | 9/2020 | |
| WO | WO 2017/029381 A1 | | 2/2017 | |

OTHER PUBLICATIONS

Yasuhiro Kurahashi, Machine Translation of JP-2012093262-A (Year: 2012).*

Japanese Office Action, dated May 11, 2021, in Japanese Application No. 2019-035551 and English Translation thereof.

* cited by examiner

LOW MAGNIFICATION Ma

LOW MAGNIFICATION Ma

HIGH MAGNIFICATION Mb

HIGH MAGNIFICATION Mb

INFORMATION PROCESSING DEVICE AND INFORMATION PROCESSING METHOD

CROSS-REFERENCE TO RELATED APPLICATION

This application is based upon and claims the benefit of priority from Japanese Patent Application No. 2019-035551 filed on Feb. 28, 2019, the contents of which are incorporated herein by reference.

BACKGROUND OF THE INVENTION

Field of the Invention

The present invention relates to an information processing device connected to a measurement device provided in the vicinity of a machine tool for machining workpieces with a tool and a numerical control device for controlling the machine tool, and also relates to an information processing method.

Description of the Related Art

A numerical control device has a display unit for displaying state information indicating the state of a machine tool. For example, Japanese Laid-Open Patent Publication No. 08-106317 discloses a numerical control device that displays on a display screen the present position of a tool in a machine coordinate system, on the basis of rotational positions of servomotors etc.

On the other hand, commercially available measurement devices include cameras with display units, field balancers used for balance control of a rotary body like a spindle, probes used to measure inclination etc. of the workpiece, and the like. Such commercially available measurement devices are generally equipped with a display unit for displaying the measured results.

SUMMARY OF THE INVENTION

However, when using commercially available measurement equipment, the operator checks the measurement information on the display unit of the measurement device and also checks the state information on the display unit of the numerical control device. That is, the operator has to check the measurement information and the state information on separate display screens. As such, in order to check the measurement information and state information more conveniently, the operator may be forced to, for example, change the position of installation of at least one of the measurement device and numerical control device. This will reduce work efficiency.

Accordingly, an object of the present invention is to provide an information processing device and information processing method that improves work efficiency.

A first aspect of the present invention is characterized by an information processing device that is connected to a measurement device and a numerical control device, the measurement device being provided in a vicinity of a machine tool configured to machine a workpiece using a tool, the numerical control device being configured to control the machine tool. The information processing device includes: a display unit configured to display information; a first acquisition unit configured to acquire, from the measurement device, measurement information measured by the measurement device; a second acquisition unit configured to acquire, from the numerical control device, state information indicating a state of the machine tool; and a display control unit configured to cause the display unit to display the measurement information and the state information.

A second aspect of the present invention is characterized by an information processing method for an information processing device that is connected to a measurement device and a numerical control device, the measurement device being provided in a vicinity of a machine tool configured to machine a workpiece using a tool, the numerical control device being configured to control the machine tool. The information processing method includes: an acquisition step of acquiring, from the measurement device, measurement information measured by the measurement device, and acquiring, from the numerical control device, state information indicating a state of the machine tool; and a display step of causing a display unit to display the measurement information and the state information.

According to the present invention, the operator can check both the measurement information and state information on a single display screen. Accordingly, the operator is not forced to change the position of installation of at least one of the measurement device and numerical control device for ease of checking both the measurement information and state information. This improves work efficiency.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The present invention will now be described in detail while referring to the accompanying drawings in conjunction with preferred embodiments.

EMBODIMENTS

First Embodiment

Figure 1:
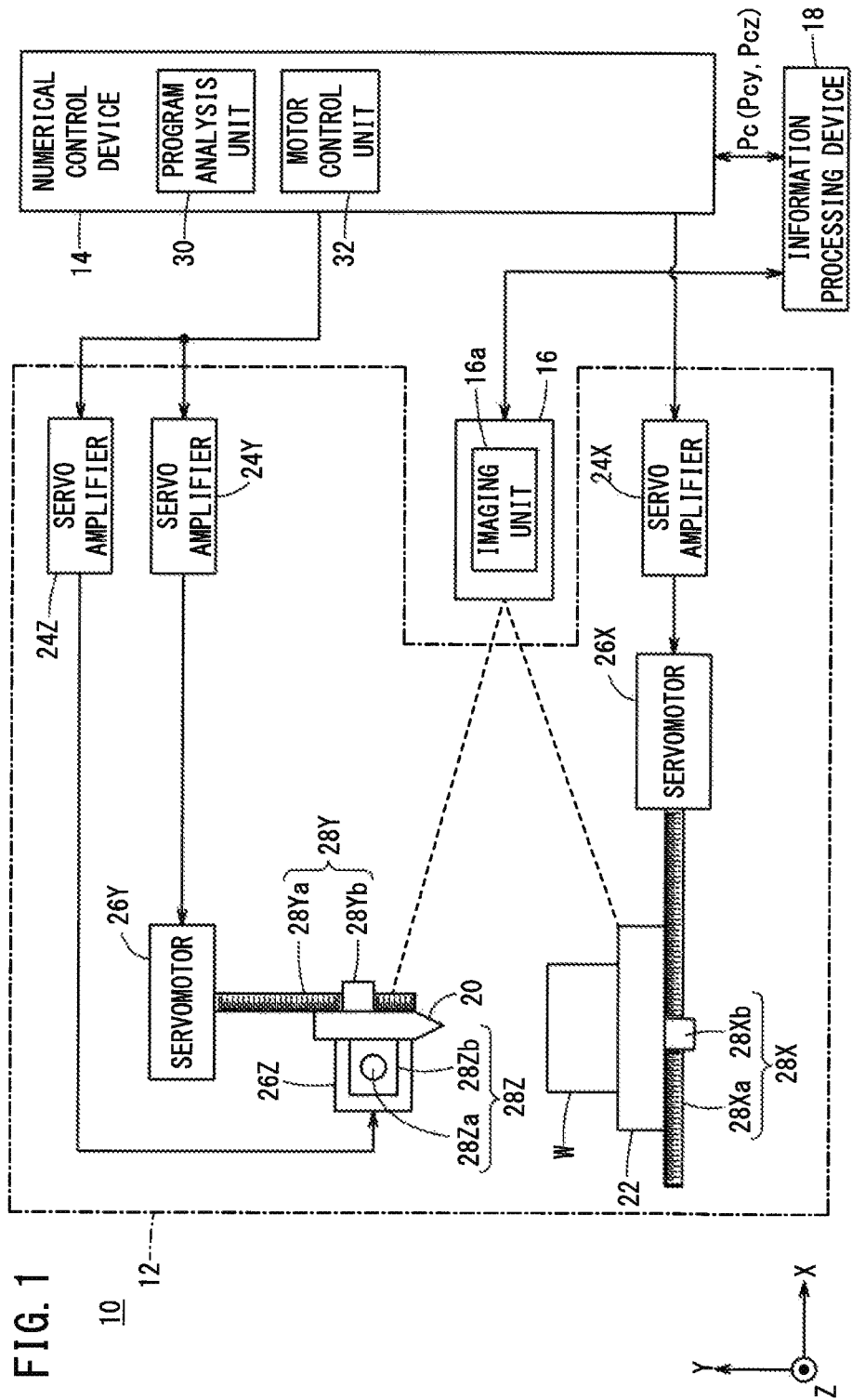
FIG. 1 is a schematic diagram illustrating a machining system according to a first embodiment.

FIG. 1 is a schematic diagram illustrating a machining system 10 according to a first embodiment. The machining system 10 includes a machine tool 12, a numerical control device 14, a measurement device 16, and an information processing device 18.

The machine tool 12 is a device that machines a workpiece W with a tool 20. The machine tool 12 includes the tool 20, a table 22, servo amplifiers 24 (24Y, 24Z, 24X), servomotors 26 (26Y, 26Z, 26X), and power conversion and transmission mechanisms 28 (28Y, 28Z, 28X).

The servomotor 26Y is a motor for axially moving the tool 20 in a Y-axis direction and the servomotor 26Z is a motor for axially moving the tool 20 in a Z-axis direction. The servomotor 26X is a motor for axially moving the table 22 in an X-axis direction. It is assumed that the X axis, Y axis, and Z axis are orthogonal to each other.

The rotational force of the servomotor (first servomotor, Y-axis servomotor) 26Y is transmitted to the tool 20 via the power conversion and transmission mechanism 28Y. The power conversion and transmission mechanism 28Y is configured to convert the rotational force of the servomotor 26Y into linear motion in the Y-axis direction. Accordingly, the tool 20 moves axially in the Y-axis direction (first direction) by rotation of the servomotor 26Y. The power conversion and transmission mechanism 28Y includes a ball screw 28Ya extending in the Y-axis direction and a nut 28Yb that is screw-engaged with the ball screw 28Ya. The ball screw 28Ya is connected to a rotary shaft (not shown) of the servomotor 26Y and rotates together with the rotary shaft of the servomotor 26Y. The nut 28Yb is connected to the tool 20. The nut 28Yb (and the tool 20) thus moves axially in the Y-axis direction as the ball screw 28Ya is rotated by the servomotor 26Y.

The rotational force of the servomotor (second servomotor, Z-axis servomotor) 26Z is transmitted to the tool 20 via the power conversion and transmission mechanism 28Z. The power conversion and transmission mechanism 28Z is configured to convert the rotational force of the servomotor 26Z into linear motion in the Z-axis direction. Accordingly, the tool 20 moves axially in the Z-axis direction (second direction) as the servomotor 26Z rotates. The power conversion and transmission mechanism 28Z includes a ball screw 28Za extending in the Z-axis direction and a nut 28Zb that is screw-engaged with the ball screw 28Za. The ball screw 28Za is connected to a rotary shaft (not shown) of the servomotor 26Z, and rotates together with the rotary shaft of the servomotor 26Z. The nut 28Zb is connected to the tool 20. The nut 28Zb (and the tool 20) thus moves axially in the Z-axis direction as the ball screw 28Za is rotated by the servomotor 26Z.

The rotational force of the servomotor (third servomotor, X-axis servomotor) 26X is transmitted to the table 22 via the power conversion and transmission mechanism 28X. The power conversion and transmission mechanism 28X is configured to convert the rotational force of the servomotor 26X into linear motion in the X-axis direction. Accordingly, the table 22 moves axially in the X-axis direction (third direction) as the servomotor 26X rotates. The power conversion and transmission mechanism 28X includes a ball screw 28Xa extending in the X-axis direction and a nut 28Xb that is screw-engaged with the ball screw 28Xa. The ball screw 28Xa is connected to a rotary shaft (not shown) of the servomotor 26X, and rotates together with the rotary shaft of the servomotor 26X. The nut 28Xb is connected to the table 22. The nut 28Xb (and the table 22) thus moves axially in the X-axis direction as the ball screw 28Xa is rotated by the servomotor 26X.

The numerical control device 14 is configured to control the machine tool 12. The numerical control device 14 includes a program analysis unit 30 and a motor control unit 32. The program analysis unit 30 analyzes a machining program stored in a storage medium (not shown) of the numerical control device 14 and outputs the analyzed results to the motor control unit 32.

On the basis of the results of analysis of the machining program, the motor control unit 32 controls the servomotors 26Y, 26Z, 26X through the servo amplifiers 24Y, 24Z, 24X. The tool 20 thus makes axial movement in the Y-axis direction and Z-axis direction and the table 22 makes axial movement in the X-axis direction, whereby the workpiece W is machined by the tool 20.

When the operator operates the information processing device 18 to effect an axial feed operation (Y-axis feed operation, Z-axis feed operation, X-axis feed operation), then the information processing device 18 provides the motor control unit 32 with a feed position (coordinate information) corresponding to the axial feed operation. In this case, the motor control unit 32 controls the servomotors 26Y, 26Z, 26X through the servo amplifiers 24Y, 24Z, 24X so as to achieve the feed position. Consequently, the tool 20 moves axially in the Y-axis direction when the operator performs a Y-axis feed operation, the tool 20 moves axially in the Z-axis direction when the operator performs a Z-axis feed operation, and the table 22 moves axially in the X-axis direction when the operator performs an X-axis feed operation.

When the operator operates the information processing device 18 to operate the measurement device 16, the information processing device 18 provides the motor control unit 32 with a movement command position Pc (Pcy, Pcz) for the tool 20. In this case, the motor control unit 32 controls the servomotor 26Y through the servo amplifier 24Y so as to achieve a first movement command position Pcy, and controls the servomotor 26Z through the servo amplifier 24Z so as to achieve a second movement command position Pcz. In this way, when the operator operates the measurement device 16, the tool 20 moves axially in at least one of the Y-axis direction and Z-axis direction.

The measurement device 16 is installed in the vicinity of the machine tool 12 and includes an imaging unit 16a configured to capture images of at least the tool 20 from a direction that intersects a plane (Y-Z plane) defined by the Y-axis direction and Z-axis direction. The imaging unit 16a has a zooming function and is capable of capturing images at an arbitrary imaging magnification M. The zooming function of the imaging unit 16a may be optical zooming or electronic zooming. In this embodiment, for example, the imaging unit 16a has a lowest imaging magnification M of 100 times and a highest imaging magnification M of 1000 times. The imaging unit 16a can thus capture images of the tool 20 at imaging magnifications M from 100 times to 1000 times. The imaging unit 16a captures images at a given frame rate. That is, it captures moving image. The imaging unit 16a is fixed in a given position by a support member (not shown).

Figure 2:
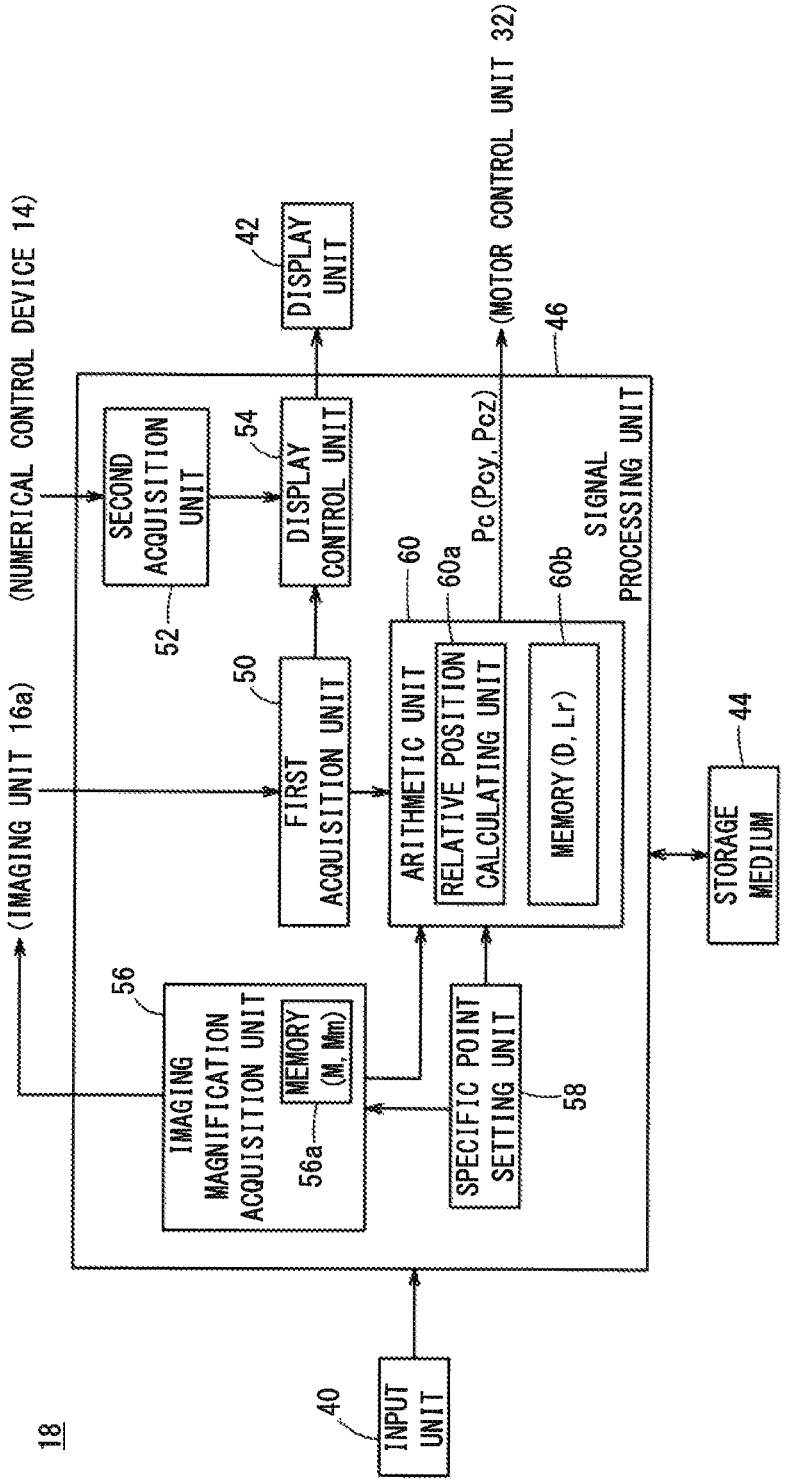
FIG. 2 is a schematic diagram illustrating the configuration of an information processing device.

The information processing device 18 is configured to process various information. The information processing device 18 is connected to the numerical control device 14 and the measurement device 16 so as to send and receive various information to and from the numerical control device 14 and the measurement device 16. FIG. 2 is a schematic diagram illustrating the configuration of the information processing device 18. The information processing device 18 includes an input unit 40, a display unit 42, a storage medium 44, and a signal processing unit 46.

The input unit 40 is an operation unit that allows the operator to enter commands etc. The input unit 40 includes a numeric keypad used for entering numerical data, a keyboard, a touch panel, a volume knob, and the like. The touch panel may be provided on a display screen of the display unit 42.

The display unit 42 is configured to display information, and the storage medium 44 is a medium that stores information. Specifically, the display unit 42 can be a liquid crystal display, and the storage medium 44 can be a hard disk, for example.

The signal processing unit 46 is connected to the input unit 40, the display unit 42, and the storage medium 44, and includes a processor such as CPU (Central Processing Unit) or MPU (Micro Processing Unit). The processor executes a basic program stored in the storage medium 44 so that the signal processing unit 46 functions as a first acquisition unit 50, a second acquisition unit 52, a display control unit 54, an imaging magnification acquisition unit 56, a specific point setting unit 58, and an arithmetic unit 60.

The first acquisition unit 50 is configured to acquire from the measurement device 16 the measurement information measured by the measurement device 16. In this embodiment, from the imaging unit 16a of the measurement device 16, the first acquisition unit 50 acquires images including the tool 20 that are captured by the imaging unit 16a. Since the imaging unit 16a captures images at a given frame rate as mentioned earlier, the first acquisition unit 50 captures the images at a given frame rate. Upon acquiring the measurement information (images including the tool 20), the first acquisition unit 50 outputs the acquired measurement information to the display control unit 54 and the arithmetic unit 60.

The second acquisition unit 52 is configured to acquire state information indicating the state of the machine tool 12 from the numerical control device 14. The state information includes the position (machine coordinates) of at least one of the tool 20 and table 22, amount of axial feed and axial feed rate, machining time of the workpiece W, operating time of the machine tool 12, rotational speed of the spindle, etc., for example. In this embodiment, the second acquisition unit 52 acquires at least the position (machine coordinates) of the tool 20 from the numerical control device 14. Upon acquiring the state information (the position of the tool 20), the second acquisition unit 52 outputs the acquired state information to the display control unit 54.

The display control unit 54 is configured to control the display unit 42. The display control unit 54 causes the display unit 42 to display the measurement information acquired by the first acquisition unit 50 and the state information acquired by the second acquisition unit 52. This allows the operator to check both the measurement information and state information on a single display screen. In this embodiment, as shown in FIG. 3, for example, the display control unit 54 provides control so as to display an image including the tool 20 acquired by the first acquisition unit 50 and the position (machine coordinates) of the tool 20 acquired by the second acquisition unit 52 on the same screen.

Thus, the operator can perform axial feed operations (Y-axis feed operation, Z-axis feed operation, X-axis feed operation) using the input unit 40 while checking the tool 20 and its machine coordinates on the single display screen. Further, while checking the tool 20 and its machine coordinates on the single display screen, the operator can also perform, using the input unit 40, operations, such as setting an imaging magnification M for the imaging unit 16a, specifying a point on the image where the operator most desires to observe the state of the tool 20, etc.

Figure 3:
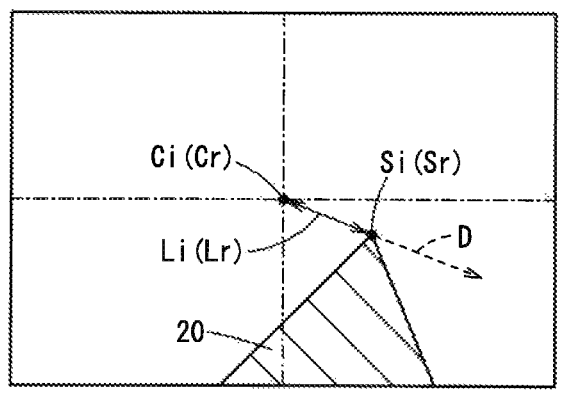
FIG. 3 is a diagram showing an example of how to display.

For the sake of convenience, FIG. 3 shows an imaging center position Ci on the image and an imaging center position Cr in the machine coordinate system, and a specific point Si on the image and a specific point Sr in the machine coordinate system. The specific point Si is a point that is specified by an operation of the input unit 40 made by the operator. FIG. 3 also shows, for convenience, a distance Li between the imaging center position Ci and the specific point Si on the image, a distance Lr between the imaging center position Cr and the specific point Sr in the machine coordinate system, and a direction D from the imaging center position Cr to the specific point Sr in the machine coordinate system.

When the operator enters an imaging magnification M by operating the input unit 40, the imaging magnification acquisition unit 56 stores the input imaging magnification M in a memory 56a and also sends the stored imaging magnification M to the imaging unit 16a. On receiving the imaging magnification M, the imaging unit 16a sets the received imaging magnification M and changes the angle of view on the basis of the set imaging magnification M. The angle of view may be changed by optical zooming in which the angle of view is changed by driving a zoom lens (not shown), or by electronic zooming in which the angle of view is changed by changing the cut (trimmed) image area.

The specific point setting unit 58 sets, as the specific point Si (see FIG. 3), a point that is specified by an operation of the input unit 40 made by the operator. It is assumed herein that the cutting edge of the tool 20 is set as the specific point Si. Having set the specific point Si, the specific point setting unit 58 outputs the position (coordinate information) of the specific point Si to the arithmetic unit 60.

Also, in the case of having set the specific point Si, the specific point setting unit 58 informs the imaging magnification acquisition unit 56 of the time of setting. In this case, the imaging magnification acquisition unit 56 recognizes the imaging magnification M that is stored in the memory 56a at the time of setting that is informed from the specific point setting unit 58, and registers the recognized imaging magnification M by storing it as a reference magnification Mm in the memory 56a. That is, the memory 56a of the imaging magnification acquisition unit 56 stores the reference magnification Mm being the imaging magnification M at the time when the specific point Si was set, and the present imaging magnification M that is set at the present time. If the imaging magnification M is changed, the imaging magnification M before the change, stored in the memory 56a, is updated to the imaging magnification M after the change, and the updated imaging magnification M is held in the memory 56a as the present imaging magnification M.

When the operator performs an axial feed operation (Y-axis feed operation, Z-axis feed operation, X-axis feed operation) using the input unit 40, the arithmetic unit 60 calculates a feed position (coordinate information) corresponding to the axial feed operation and outputs the calculated feed position to the motor control unit 32.

Further, when the imaging magnification M for the imaging unit 16a is changed by the operator using the input unit 40, the arithmetic unit 60 calculates a movement command position Pc on the basis of the imaging magnification M before the change and the imaging magnification M after the change in such a manner that the relative positional relationship between the specific point Si (see FIG. 3) and the imaging center position Ci (see FIG. 3) on the image remains unchanged before and after the imaging magnification M is changed.

For example, the arithmetic unit 60 can calculate the movement command position Pc by using a relative position calculating unit 60a and a memory 60b. That is, as shown in FIG. 3, the relative position calculating unit 60a calculates a relative positional relationship between the specific point Sr and imaging center position Cr in the machine coordinate system, based on the reference magnification Mm and the position of the specific point Si on the image at the time when the specific point Si was set. As the relative positional relationship in the machine coordinate system, the relative position calculating unit 60a calculates a direction D from the imaging center position Cr to the specific point Sr in the machine coordinate system and an actual distance Lr between the imaging center position Cr in the machine coordinate system and the specific point Sr in the machine coordinate system. That is, the direction D and distance Lr constitute information that indicates the relative positional relationship between the specific point Sr and the imaging center position Cr in the machine coordinate system. This relative positional relationship is stored in the memory 60b.

As a method for calculating the direction D, for example, a direction of the specific point Si as viewed from the imaging center position Ci on the image may be calculated as the direction D. Alternatively, the position of the specific point Sr in the machine coordinate system may be obtained from the reference magnification Mm and the position of the specific point Si on the image, and the direction D may be then calculated from the calculated position of the specific point Sr and the imaging center position Cr in the machine coordinate system.

The distance Lr may be calculated by, for example, calculating the distance Li between the position of the specific point Si on the image and the imaging center position Ci on the image and then calculating the distance Lr from the calculated distance Li and the reference magnification Mm. Alternatively, the distance Lr may be calculated by obtaining the position of the specific point Sr in the machine coordinate system from the reference magnification Mm and the position of the specific point Si on the image and then calculating the distance Lr from the calculated specific point Sr and the imaging center position Cr in the machine coordinate system. Note that the imaging center position Ci on the image and the imaging center position Cr in the machine coordinate system are already known and previously stored in the memory 60b.

When the imaging magnification M is changed, the arithmetic unit 60 calculates the movement command position Pc on the basis of the distance Lr and the direction D calculated by the relative position calculating unit 60a and a ratio between the imaging magnifications M before and after the change. In this embodiment, the ratio between the imaging magnifications M before and after the change is the ratio of the imaging magnification M after the change to the reference magnification Mm. For example, if this ratio is $\alpha$ and the imaging magnification M after the change is M', then $\alpha = M'/Mm$.

For more details of the calculation of the movement command position Pc, the arithmetic unit 60 calculates the movement command position Pc in a manner so that the specific point Sr in the machine coordinate system moves to the position of an intersecting point between the direction D and a circle having a radius of $Lr \times 1/\alpha$ from the imaging center position Cr in the machine coordinate system.

Upon calculating the movement command position Pc, the arithmetic unit 60 outputs the calculated movement command position Pc to the motor control unit 32. As mentioned earlier, the motor control unit 32 controls the servomotors 26Y, 26Z based on the movement command position Pc to thereby axially move the tool 20. Specifically, the tool 20 is moved axially in the direction D such that the distance from the imaging center position Cr to the specific point Sr in the machine coordinate system becomes $Lr \times 1/\alpha$.

Figure 4:
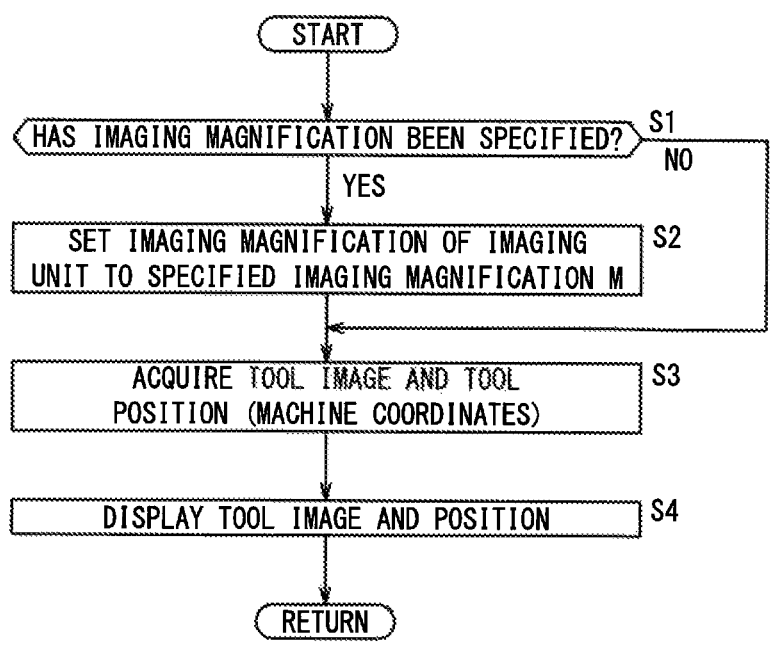
FIG. 4 is a flowchart showing the flow of image display processing.

Next, display processing by the information processing device 18 will be described. FIG. 4 is a flowchart showing the flow of image display processing. At step S1, the imaging magnification acquisition unit 56 determines whether an imaging magnification M for the imaging unit 16a has been specified (entered) by an operation of the input unit 40 made by the operator.

Here, if an imaging magnification M has been specified, the imaging magnification acquisition unit 56 moves to step S2 to store the specified imaging magnification M in the memory 56a and also causes the imaging unit 16a to set the specified imaging magnification M, and then the process moves to step S3. On the other hand, if no imaging magnification M is specified, the imaging magnification acquisition unit 56 proceeds to step S3 without moving to step S2.

At step S3, the first acquisition unit 50 acquires, from the imaging unit 16a, images containing the tool 20 captured by the imaging unit 16a, and the second acquisition unit 52 acquires the position (machine coordinates) of the tool 20 from the numerical control device 14. When the images and the position have both been acquired, the process moves to step S4.

At step S4, the display control unit 54 causes the image including the tool 20 acquired by the first acquisition unit 50 and the position (machine coordinates) of the tool 20 acquired by the second acquisition unit 52 to be displayed on the same screen (see FIG. 3) and the process returns to step S1.

Figure 5:
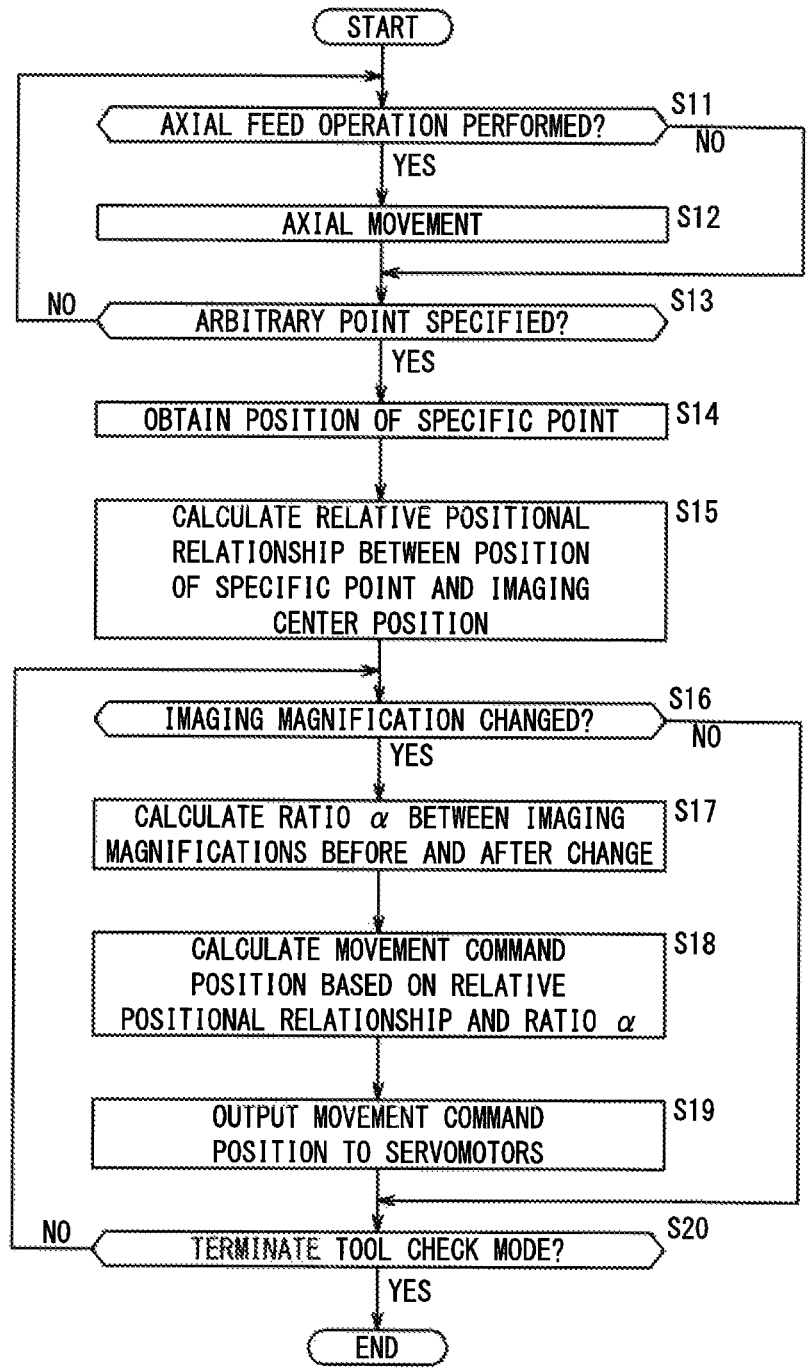
FIG. 5 is a flowchart showing the process flow of a tool check mode.

Next, a tool check mode of the information processing device 18 will be described. This tool check mode is a mode for checking the state of the tool 20 and is executed in parallel with the image display processing shown in FIG. 4. FIG. 5 is a flowchart showing the process flow of the tool check mode.

When the tool check mode for checking the state of the tool 20 is set, the arithmetic unit 60 determines at step S11 whether an axial feed operation has been performed by the operator operating the input unit 40.

Now, the operator can perform the axial feed operation such that the tool 20 enters into the imaging area (the angle of view) of the imaging unit 16a, while checking the image including the tool 20 and the position (machine coordinates) of the tool 20 that are displayed on the display unit 42 by the image display processing described above. Further, the operator can perform the axial feed operation so that the relative positional relationship between the tool 20 and the imaging center position Ci on the image displayed on the display unit 42 becomes a desired positional relationship.

When the axial feed operation is performed, the arithmetic unit 60 proceeds to step S12 to calculate a feed command position corresponding to the axial feed operation and outputs the feed command position to the motor control unit 32, to thereby axially move the tool 20 or the table 22. Then, the process moves to step S13. On the other hand, when axial feed operation is not performed at step S11, the arithmetic unit 60 moves to step S13.

At step S13, the specific point setting unit 58 determines whether an arbitrary point on the tool 20 has been specified on the image displayed on the display unit 42, by an operation of the input unit 40 made by the operator. The operator can specify an arbitrary point (cutting edge) of the tool 20 while checking the image including the tool 20 and the position (machine coordinates) of the tool 20 that are displayed on the display unit 42 by the above-described display processing. The operator can specify an arbitrary point on the tool 20 by operating a mouse or the like, or can specify an arbitrary point on the tool 20 by touching the display screen of the display unit 42 on which the touch panel is provided.

If the specific point setting unit 58 determines that no arbitrary point of the tool 20 is specified, the process returns to step S11; if the specific point setting unit 58 determines that an arbitrary point of the tool 20 has been specified, the process moves to step S14.

At step S14, the specific point setting unit 58 sets the specified point as the specific point Si. The imaging magnification M at the time of setting is stored as the reference magnification Mm in the memory 56a of the imaging magnification acquisition unit 56. On setting the specific point Si, the specific point setting unit 58 calculates and obtains the position of the set specific point Si on the image and the process moves to step S15.

At step S15, the relative position calculating unit 60a calculates the relative positional relationship (direction D, distance Lr) between the position of the specific point Sr and the imaging center position Cr in the machine coordinate system, on the basis of the position of the specific point Si on the image that was set at step S14 and the reference magnification Mm. On calculating the relative positional relationship (direction D, distance Lr), the relative position calculating unit 60a stores the positional relationship (direction D, distance Lr) in the memory 60b and then the process moves to step S16.

At step S16, the imaging magnification acquisition unit 56 determines whether the imaging magnification M has been changed by an operation made by the operator. If the imaging magnification acquisition unit 56 determines that the imaging magnification M has been changed, the process moves to step S17; if the imaging magnification acquisition unit 56 determines that the imaging magnification M has not been changed, the process moves to step S20. When the imaging magnification M has been changed, the imaging magnification acquisition unit 56 acquires the imaging magnification M after having been changed and stores the acquired imaging magnification M in the memory 56a.

At step S17, the arithmetic unit 60 calculates the ratio α between the imaging magnifications M before and after the change (the ratio of the imaging magnification M after the change, to the reference magnification Mm) and the process moves to step S18.

At step S18, the arithmetic unit 60 calculates the movement command position Pc (Pcy, Pcz) on the basis of the relative positional relationship (direction D, distance Lr) obtained at step S15 and the ratio α obtained at step S17. More specifically, it calculates the movement command position Pc (Pcy, Pcz) so that the specific point Sr in the machine coordinate system moves to the position of the intersecting point between the direction D and a circle having a radius of Lr×1/α from the imaging center position Cr in the machine coordinate system. When the calculation of the movement command position Pc (Pcy, Pcz) is completed, the arithmetic unit 60 moves to step S19.

At step S19, the arithmetic unit 60 outputs the movement command position Pc (Pcy, Pcz) to the motor control unit 32 and the process moves to step S20. The motor control unit 32 controls the servomotors 26Y, 26Z on the basis of the movement command position Pc (Pcy, Pcz). Consequently, the tool 20 moves along the direction D in a manner so that the distance from the imaging center position Cr to the specific point Sr in the machine coordinate system becomes Lr×1/α. As a result, on the display screen of the display unit 42, the relative positional relationship between the imaging center position Ci and the specific point Si on the image is kept unchanged before and after the change in the imaging magnification M.

At step S20, the signal processing unit 46 determines whether the tool check mode has ended. When the setting of the tool check mode is cancelled by an operation of the input unit 40 made by the operator, the signal processing unit 46 determines that the tool check mode has ended.

If the signal processing unit 46 determines that the tool check mode has not ended, the process returns to step S16 and the above-described operations are repeated. On the other hand, if the signal processing unit 46 determines that the tool check mode has ended, the tool check mode is terminated.

Figure 6:
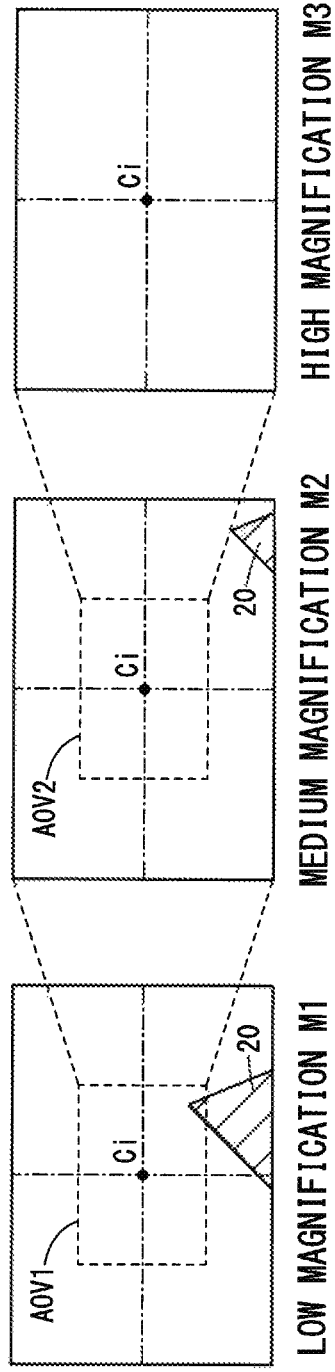
FIG. 6A is a diagram illustrating an image of a tool captured at a low imaging magnification according to a conventional technique.
FIG. 6B is a diagram illustrating an image of the tool captured at a medium imaging magnification according to the conventional technique.
FIG. 6C is a diagram illustrating an image of the tool captured at a high imaging magnification according to the conventional technique.

Next, images that are displayed when the imaging magnification M is changed in this embodiment will be described in comparison with a conventional example. FIG. 6A is a diagram illustrating an image of the tool 20 captured at a low imaging magnification M (hereinafter referred to as M1) by a conventional technique, FIG. 6B is a diagram illustrating an image of the tool 20 captured at a medium imaging magnification M (hereinafter referred to as M2) by the conventional technique, and FIG. 6C is a diagram illustrating an image of the tool 20 captured at a high imaging magnification M (hereinafter referred to as M3) by the conventional technique. Note that M1<M2<M3 and that the tool 20 is at the same position in the machine coordinate system in FIGS. 6A to 6C.

As shown in FIG. 6A, in the case of the low imaging magnification M1, the tool 20 is present in the vicinity of the imaging center position Ci on the image. However, when the imaging magnification M is changed to the medium imaging magnification M2, the angle of view of the image becomes smaller, and as a result, as shown in FIG. 6B, the tool 20 separates away from the imaging center position Ci on the image and moves into a region at the lower right of the image. Furthermore, as shown in FIG. 6C, when the imaging magnification M is changed to the high imaging magnification M3, the angle of view of the image becomes further smaller and so the tool 20 is framed out (i.e., the tool falls outside the image frame). The frame AOV1 shown in FIG. 6A indicates the angle of view at the imaging magnification M2 and the frame AOV2 shown in FIG. 6B indicates the angle of view at the imaging magnification M3, which applies to FIGS. 7A and 7B as well.

Figure 7:
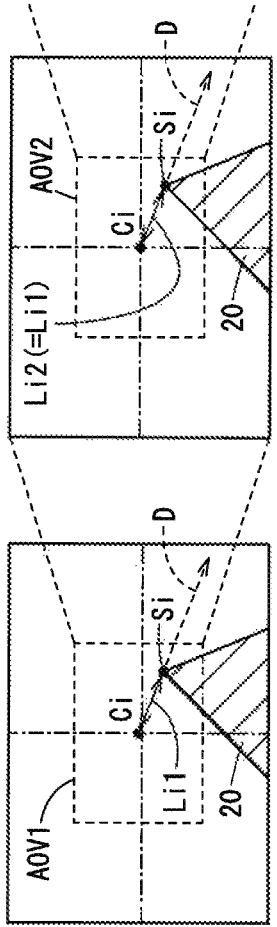
FIG. 7A is a diagram illustrating an image of a tool captured at a low imaging magnification using the machining system of FIG. 1.
FIG. 7B is a diagram illustrating an image of the tool captured at a medium imaging magnification using the machining system of FIG. 1.
FIG. 7C is a diagram illustrating an image of the tool captured at a high imaging magnification using the machining system of FIG. 1.

In contrast thereto, FIG. 7A is a diagram illustrating an image of the tool 20 captured at a low imaging magnification M1 in the machining system 10 of FIG. 1, FIG. 7B is a diagram illustrating an image of the tool 20 captured at a medium imaging magnification M2 in the machining system 10 of FIG. 1, and FIG. 7C is a diagram illustrating an image of the tool 20 captured at a high imaging magnification M3 in the machining system 10 of FIG. 1. Note that M1<M2<M3, M2=M1×α1, M3=M1×α2=M2×α3, α2>α1>0, and α2=α1×α3.

The image shown in FIG. 7A is captured at the low imaging magnification M1, where the tool 20 is present in the vicinity of the imaging center position Ci. Now, it is assumed that, on the image shown in FIG. 7A, the operator has specified the cutting edge of the tool 20 as the specific point Si. The imaging magnification M1 is therefore treated as the reference magnification Mm. In the state shown in FIG. 7A, the distance Lr between the cutting edge Sr and the imaging center position Cr in the machine coordinate system is denoted by Lr1, and the distance Li between the cutting edge Si and the imaging center position Ci on the image is denoted by Li1.

The image shown in FIG. 7B is captured at the medium imaging magnification M2. In the state shown in FIG. 7B, the distance Lr between the specific point Sr and the imaging center position Cr in the machine coordinate system is denoted by Lr2, and the distance Li between the cutting edge Si and the imaging center position Ci on the image is denoted by Li2. As has been described above, when the imaging magnification M is changed from M1 to M2, the tool 20 is moved toward the imaging center position Cr in the direction D so that the distance Lr2 between the cutting edge Sr and the imaging center position Cr in the machine coordinate system becomes Lr2=Lr1×1/α1. At this time, the tool 20 is moved in the direction D by the distance (Lr1−Lr1×1/α1) so as to approach the imaging center position Cr.

As a result, the distance Li2 between the cutting edge Si and the imaging center position Ci on the image shown in FIG. 7B is given by Li2=α1×Li1×1/α1=Li1, and the direction of the cutting edge Si as viewed from the imaging center position Ci also coincides with the direction D. In this way, the relative positional relationship between the specific point Si of the tool 20 and the imaging center position Ci on the image is unchanged from that at the imaging magnification M1 even when the imaging magnification M is changed from M1 to M2.

The image shown in FIG. 7C is captured at the high imaging magnification M3. In the state shown in FIG. 7C, the distance Lr between the specific point Sr and the imaging center position Cr in the machine coordinate system is denoted by Lr3, and the distance Li between the cutting edge Si and the imaging center position Ci on the image is denoted by Li3. As has been described above, when the imaging magnification M is further changed from M2 to M3, the tool 20 is moved toward the imaging center position Cr in the direction D so that the distance Lr3 between the cutting edge Sr and the imaging center position Cr in the machine coordinate system becomes Lr3=Lr1×1/α2=Lr2×1/α3. At this time, the tool 20 moves in the direction D by the distance (Lr2−Lr1×1/α2=Lr2−Lr2×1/α3) so as to approach the imaging center position Cr.

As a result, the distance Li3 between the cutting edge Si and the imaging center position Ci on the image shown in FIG. 7C is given by Li3=α2×Li1×1/α2=Li1, or Li3=α3× Li2×1/α3=Li2=Li1, and the direction of the cutting edge Si as viewed from the imaging center position Ci also coincides with the direction D. In this way, the relative positional relationship between the specific point Si of the tool 20 and the imaging center position Ci on the image is unchanged from that at the imaging magnifications M1 and M2 even when the imaging magnification M is changed from M2 to M3.

In the foregoing manner, in this embodiment, it is possible to maintain the relative positional relationship between the imaging center position Ci and the position of the specific point (cutting edge) Si on the image even when the imaging magnification M is changed. It is hence possible to prevent a situation in which the specific point (cutting edge) Si becomes framed out from the image (i.e., a situation in which the specific point Si falls outside the image area) even when the imaging magnification M is changed from a lower magnification to a higher magnification. Moreover, the operator can easily check the tool 20 (in particular, the specific point Si thereon) since the relative positional relationship between the imaging center position Ci and the position of the specific point (cutting edge) Si on the image is unchanged even when the imaging magnification M is changed.

Second Embodiment

Figure 8:
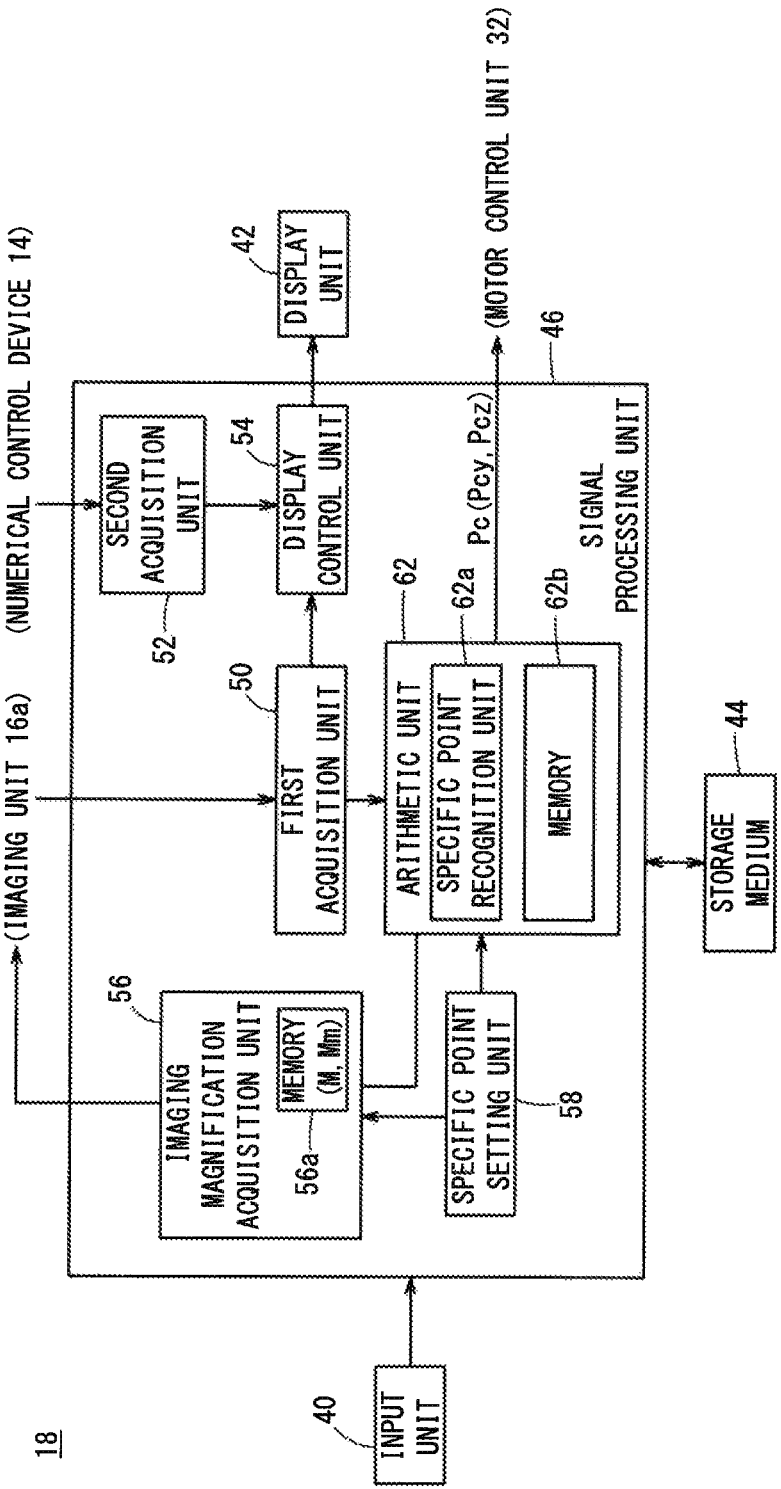
FIG. 8 is a schematic diagram illustrating a machining system according to a second embodiment.

FIG. 8 is a schematic diagram illustrating a machining system 10 according to a second embodiment. The same reference numerals as those used in the first embodiment denote the same constituent features. Therefore, such features will not be described again, and only features that differ from those of the first embodiment will be described in detail.

In the machining system 10 of the first embodiment described above, the tool 20 is axially moved in a manner so that the relative positional relationship between the specific point Si and the imaging center position Ci on the image is kept unchanged before and after the imaging magnification M is changed. With the machining system 10 of this embodiment, on the other hand, the tool 20 is axially moved in a manner so that the position of the specific point Si of the tool 20 on the image and the imaging center position (the position of a predetermined reference point) Ci on the image coincide with each other.

The machining system 10 of this embodiment differs from that of the first embodiment in that it includes an arithmetic unit 62 in place of the arithmetic unit 60 of the first embodiment. The arithmetic unit 62 includes a specific point recognition unit 62a and a memory 62b. When a specific point Si on the tool 20 is set by the specific point setting unit 58, the specific point recognition unit 62a extracts a feature of the specific point Si on the tool 20, on the basis of the position of the specific point Si on the image that is outputted from the specific point setting unit 58 and the image acquired by the first acquisition unit 50, and then stores the extracted feature in the memory 62b. For example, the specific point recognition unit 62a may extract, as a feature of the specific point Si, a relative positional relationship between the set specific point Si and the contour of the tool 20 or the shape of the tool 20, or may extract some feature of the set specific point Si itself. In essence, any feature that enables the specific point Si to be recognized is sufficient.

On the basis of the feature stored in the memory 62b, the specific point recognition unit 62a recognizes at which position the specific point Si is present in the image captured at the imaging magnification M after having been changed, which was newly acquired by the first acquisition unit 50. The specific point recognition unit 62*a* recognizes the position of the specific point Si by analyzing the image captured at the newly acquired, changed imaging magnification M.

The arithmetic unit 62 calculates the movement command position Pc for the tool 20 on the basis of the position of the specific point Si on the image and the imaging magnification M of the image, in a manner so that the position of the specific point Si of the tool 20 on the image coincides with the imaging center position Ci on the image. The arithmetic unit 62 does not have to calculate the movement command position Pc for the tool 20 when the position of the specific point Si of the tool 20 on the image and the imaging center position Ci on the image are not shifted from each other.

Specifically, the arithmetic unit 62 calculates the position of the specific point Sr in the machine coordinate system from the position of the specific point Si on the image outputted from the specific point setting unit 58 and the present imaging magnification M. Then, the arithmetic unit 62 calculates the movement command position Pc (Pcy, Pcz) on the basis of the calculated position of the specific point Sr and the imaging center position Cr in the machine coordinate system. That is, the arithmetic unit 62 calculates the movement command position Pc (Pcy, Pcz) in such a manner that the specific point Sr in the machine coordinate system moves to the imaging center position Cr in the machine coordinate system. The imaging center position Ci on the image and the imaging center position Cr in the machine coordinate system are stored in the memory 62*b*.

Figure 9:
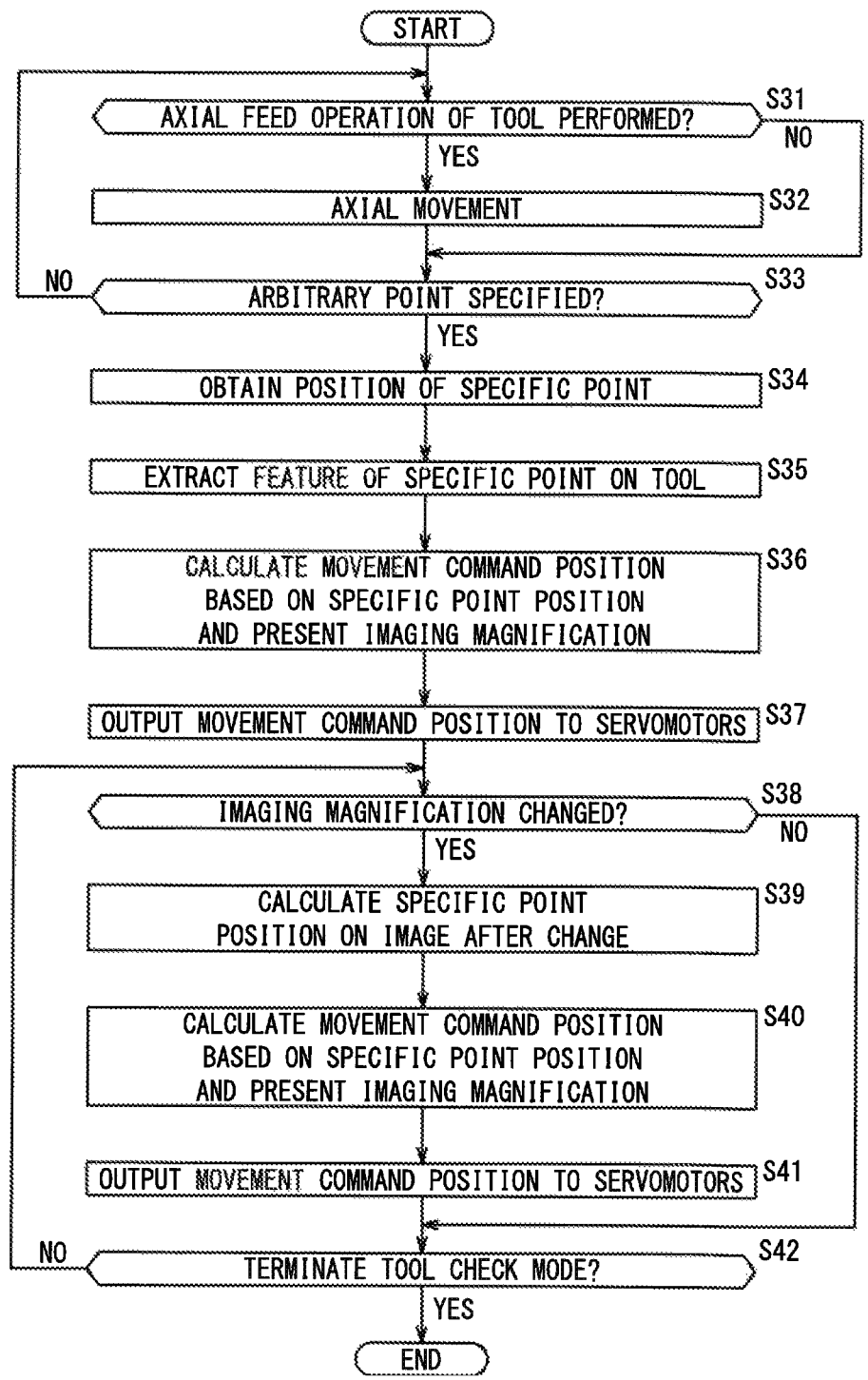
FIG. 9 is a flowchart showing the flow of a tool check mode of the second embodiment.

FIG. 9 is a flowchart showing the flow of a tool check mode of the second embodiment. Like that of the first embodiment, the tool check mode of this embodiment is executed in parallel with the above-described image display processing shown in FIG. 4.

When the tool check mode for checking the state of the tool 20 is set, the arithmetic unit 62 determines at step S31 whether an axial feed operation has been performed by the operator operating the input unit 40.

Now, the operator can perform the axial feed operation such that the tool 20 enters into the imaging area (angle of view) of the imaging unit 16*a*, while checking the image including the tool 20 and the position (machine coordinates) of the tool 20 that are displayed on the display unit 42 by the image display processing described above. Further, the operator can perform the axial feed operation so that the relative positional relationship between the tool 20 and the imaging center position Ci on the image displayed on the display unit 42 becomes a desired positional relationship.

When the axial feed operation is performed, the arithmetic unit 62 moves to step S32 to calculate a feed command position corresponding to the axial feed operation and outputs the feed command position to the motor control unit 32, to thereby axially move the tool 20 or the table 22. Then, the process moves to step S33. On the other hand, when axial feed operation is not performed, the arithmetic unit 62 moves to step S33.

At step S33, the specific point setting unit 58 determines whether an arbitrary point on the tool 20 has been specified on the image displayed on the display unit 42, by an operation of the input unit 40 made by the operator. The operator can specify an arbitrary point on the tool 20 by operating a mouse or the like, or can specify an arbitrary point on the tool 20 by touching the display screen of the display unit 42 on which a touch panel is installed.

If the specific point setting unit 58 determines that no arbitrary point on the tool 20 is specified, the process returns to step S31; if the specific point setting unit 58 determines that an arbitrary point on the tool 20 has been specified, the process moves to step S34.

At step S34, the specific point setting unit 58 sets the specified point as the specific point Si. The imaging magnification M at the time of setting is stored as the reference magnification Mm in the memory 56*a* of the imaging magnification acquisition unit 56. On setting the specific point Si, the specific point setting unit 58 calculates and obtains the position of the specific point Si set on the image and the process moves to step S35.

At step S35, the specific point recognition unit 62*a* extracts the feature of the specific point Si on the tool 20 on the basis of the position of the specific point Si on the image set at step S34 and the image acquired by the first acquisition unit 50. After extracting the feature of the specific point Si, the specific point recognition unit 62*a* stores the feature in the memory 62*b* and then the process moves to step S36.

At step S36, the arithmetic unit 62 calculates the movement command position Pc of the tool 20 on the basis of the position of the specific point Si on the image that was set at step S34 and the present imaging magnification M, in such a manner that the position of the specific point Si of the tool 20 on the image coincides with the imaging center position Ci on the image. On completion of the calculation for the movement command position Pc for the tool 20, the arithmetic unit 62 moves to step S37.

At step S37, the arithmetic unit 62 outputs the movement command position Pc (Pcy, Pcz) to the motor control unit 32 and moves to step S38. On the basis of the movement command position Pc (Pcy, Pcz), the motor control unit 32 controls the servomotors 26Y, 26Z. The position of the specific point Si of the tool 20 and the imaging center position Ci thus coincide with each other on the image.

At step S38, the imaging magnification acquisition unit 56 determines whether the imaging magnification M has been changed by an operation made by the operator. If the imaging magnification acquisition unit 56 determines that the imaging magnification M has been changed, the process moves to step S39; if the imaging magnification acquisition unit 56 determines that the imaging magnification M has not been changed, the process moves to step S42. When the imaging magnification M has been changed, the imaging magnification acquisition unit 56 acquires the imaging magnification M after having been changed and stores the acquired imaging magnification M in the memory 56*a*.

At step S39, the specific point recognition unit 62*a* calculates the position of the specific point Si on the image that was captured at the changed (present) imaging magnification M, on the basis of the feature extracted at step S35, and then the process moves to step S40.

At step S40, the arithmetic unit 62 calculates the movement command position Pc (Pcy, Pcz) for the tool 20 on the basis of the position of the specific point Si on the image that was calculated at step S39 and the changed (present) imaging magnification M in a manner so that the position of the specific point Si of the tool 20 on the image captured at the changed (present) imaging magnification M and the imaging center position Ci on the image coincide with each other. When calculation of the movement command position Pc (Pcy, Pcz) is completed, the arithmetic unit 62 moves to step S41.

At step S41, the arithmetic unit 62 outputs the movement command position Pc (Pcy, Pcz) to the motor control unit 32 and the process moves to step S42. On the basis of the movement command position Pc (Pcy, Pcz), the motor control unit 32 controls the servomotors 26Y, 26Z. The position of the specific point Si of the tool 20 and the imaging center position Ci thus coincide with each other on the image.

At step S42, the signal processing unit 46 determines whether the tool check mode has ended. When the setting of the tool check mode is cancelled by an operation of the input unit 40 made by the operator, the signal processing unit 46 determines that the tool check mode has ended.

If the signal processing unit 46 determines that the tool check mode has not ended, the process returns to step S38 and the above-described operations are repeated. On the other hand, if the signal processing unit 46 determines that the tool check mode has ended, the tool check mode is terminated.

Figure 10A:
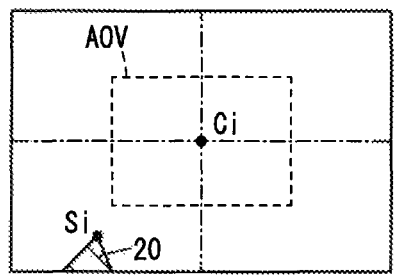
FIG. 10A is a diagram illustrating an image of a tool captured at a low imaging magnification.
Figure 10B:
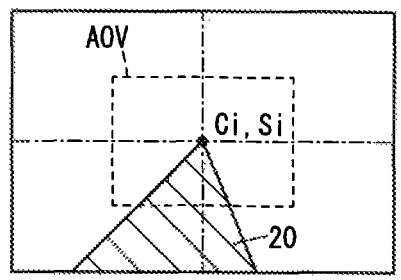
FIG. 10B is a diagram illustrating an image of the tool captured when a certain time has passed after a specific point was set on the image shown in FIG. 10A.
Figure 10C:
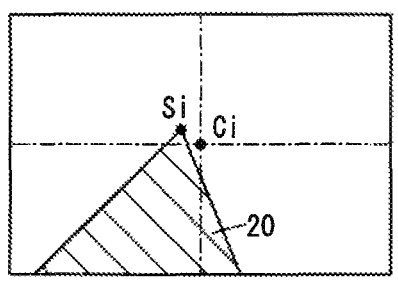
FIG. 10C is a diagram illustrating an image of the tool captured immediately after the imaging magnification has been changed from the lower imaging magnification to a higher imaging magnification.
Figure 10D:
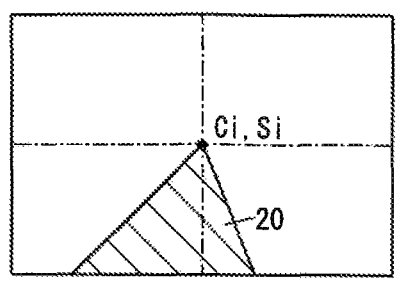
FIG. 10D is a diagram illustrating an image of the tool captured when a certain time has passed after the imaging magnification was changed.

Next, images captured by the machining system 10 of this embodiment will be described. FIG. 10A is a diagram illustrating an image of the tool 20 captured at a low imaging magnification Ma, FIG. 10B is a diagram illustrating an image of the tool 20 captured after the elapse of a certain time from having set a specific point Si on the image shown in FIG. 10A, FIG. 10C is a diagram illustrating an image of the tool 20 captured immediately after the low imaging magnification Ma has been changed to a high imaging magnification Mb, and FIG. 10D is a diagram illustrating an image of the tool 20 captured after the elapse of a certain time from having changed to the imaging magnification Mb. The frames AOV shown in FIGS. 10A and 10B indicate the angle of view at the imaging magnification Mb.

If the cutting edge is set as the specific point Si in the state shown in FIG. 10A, the tool 20 moves in such a way that the cutting edge Si on the image comes to the imaging center position Ci as shown in FIG. 10B. After that, when the imaging magnification M is changed from Ma to Mb, then, as shown in FIG. 10C, the position of the specific point Si displayed on the image deviates from the imaging center position Ci. The reason is as follows. Since the cutting edge Si is specified and set on the image at the low imaging magnification Ma, even if the position of the cutting edge Sr in the machine coordinate system is calculated from the imaging magnification Ma and the set position of the cutting edge Si on the image, an error will occur between the calculated position and the actual position of the cutting edge Si in the machine coordinate system. Although this error is unnoticeable on the image captured at the lower magnification, when the cutting edge Si is imaged at the higher magnification, such an error will appear.

Even when the position of the cutting edge Si on the image captured at the high imaging magnification Mb is deviated from the imaging center position Ci, the tool 20 moves so that, as shown in FIG. 10D, the cutting edge Si comes to the imaging center position Ci on the image captured at the high imaging magnification Mb.

In this way, according to this embodiment, the tool 20 can be moved so that the specific point (cutting edge) Si of the tool 20 on the image comes to the imaging center position Ci. Hence, even if the imaging magnification M is changed, the position of the specific point (cutting edge) Si on the image coincides with the imaging center position Ci, whereby the specific point (cutting edge) Si is prevented from being framed out (from falling outside the image area). Furthermore, the operator can check the tool 20 easily (in particular, the specific point Si).

[Modifications]

At least one of the above-described first embodiment and second embodiment can be modified in the following ways.

(First Modification)

In the above-described first embodiment and second embodiment, images of the tool 20 are captured in order to check the state of the tool 20, but images of the workpiece W may be captured in order to check the state of the workpiece W. In this case, the operator specifies an arbitrary point on the workpiece W on the image, and the specific point setting unit 58 sets the specified arbitrary point on the workpiece W as the specific point Si. Hence, in a first modification, it is necessary to install the measurement device 16 in such a manner that it can capture images of axial movement of the table 22 (workpiece W). Specifically, the measurement device 16 is located in such a position that it can capture images of the table 22 (workpiece W) from a direction that intersects the movement direction of the table 22 (X-axis direction).

(Second Modification)

In the above-described first embodiment and second embodiment, the table 22 (workpiece W) is axially moved in a single-axis direction (X-axis direction). However, the table 22 (workpiece W) may be axially moved on a plane (e.g. on the XY plane, on the XZ plane, etc.). When capturing images of the state of axial movement of the table 22 (workpiece W) is desired, the measurement device 16 may be installed such that it can capture images from a direction that intersects (preferably, is perpendicular to) the plane on which the table 22 axially moves.

(Third Modification)

In the above-described first embodiment and second embodiment, the specific point setting unit 58 sets as the specific point Si an arbitrary point of the tool 20 that is specified by an operation of the input unit 40 made by the operator. However, a predetermined point on the tool 20 may be set as the specific point Si. In this case, the specific point setting unit 58 may obtain an image from the first acquisition unit 50 and apply image analysis to the obtained image to thereby extract a predetermined feature point on the tool 20, and may set the extracted feature point as the specific point Si. The specific point Si can thus be set automatically even when the specific point Si is not specified by an operator. In this case, the operator may provide an instruction on when to set the specific point Si. This is because the operator occasionally wishes to set the specific point Si after having established a desired relative positional relationship between the imaging center position Ci and the tool 20 on the image by performing an axial feed operation.

(Fourth Modification)

In the above-described first embodiment and second embodiment, the imaging center position Cr in the machine coordinate system is known beforehand. However, the arithmetic unit 60, 62 may calculate the imaging center position Cr in the machine coordinate system from the imaging center position Ci on the captured image, and the present imaging magnification M.

(Fifth Modification)

In the above-described first embodiment and second embodiment, the movement command position Pc is calculated using the ratio α of the imaging magnification M after having been changed, to the reference magnification Mm. However, the movement command position Pc may be calculated using the previous imaging magnification M and the changed (present) imaging magnification M. In this case, the memory 56a has to also store at least the previous imaging magnification M.

Calculating the movement command position Pc from the previous imaging magnification M (≠ reference magnification Mm) and the imaging magnification M after having been changed uses the distance Lr (the distance Lr at the time of the previous imaging magnification M) between the position of the specific point Sr and the imaging center position Cr in the machine coordinate system obtained when the tool 20 was moved based on the movement command position Pc calculated when the imaging magnification M was changed to the previous imaging magnification M. The distance Lr at the time of the previous imaging magnification M may be obtained using the distance Lr at the time of the reference magnification Mm, or may be obtained from the movement command position Pc calculated at the change to the previous imaging magnification M.

Alternatively, the relative positional relationship (direction D, distance Lr) between the specific point Sr and the imaging center position Cr in the machine coordinate system at the time when the image was captured at the previous imaging magnification M ($\neq$ reference magnification Mm) may be newly calculated. Newly calculating this relative positional relationship requires recognizing the position of the specific point Si on the image captured at the previous imaging magnification M after the axial movement has been made due to the change to the previous imaging magnification M ($\neq$ reference magnification Mm). As such, the position of the specific point Si on the image can be recognized by providing a specific point recognition unit 62a, as explained in the second embodiment, in the arithmetic unit 60. Then, the movement command position Pc can be obtained from the newly calculated relative positional relationship at the previous imaging magnification M, the previous imaging magnification M, and the present imaging magnification M.

(Sixth Modification)

The above-described first embodiment and second embodiment use the power conversion and transmission mechanisms 28 including the servomotors 26, ball screws 28Xa, 28Ya, 28Za, and the nuts 28Xb, 28Yb, 28Zb in order to axially move the tool 20 or workpiece W. In the mechanisms for axially moving the tool 20 or workpiece W, the ball screws 28Xa, 28Ya, 28Za may be replaced by aerostatic lead screws.

Similarly, as the mechanisms for axially moving the tool 20 or workpiece W, the power conversion and transmission mechanisms 28 including the servomotors 26, ball screws 28Xa, 28Ya, 28Za, and the nuts 28Xb, 28Yb, 28Zb may be replaced by linear motors (motors) including static pressure bearings.

(Seventh Modification)

The second embodiment above has explained the imaging center position Ci as the position of a predetermined reference point. However, the operator may arbitrarily change the position of the reference point by operating the input unit 40. In this case, the angle of view may be changed in accordance with the imaging magnification M so that the center of the angle of view of the image becomes the reference point, or the position of the reference point specified by the operator may be used as the reference point as it is, without changing the angle of view in accordance with the imaging magnification M. Accordingly, when a point other than the imaging center position Ci is specified as the reference point, the measurement device 16 enlarges the image by way of electronic zooming. In this case, the arithmetic unit 62 stores the position of the reference point on the image in the memory 62b. The arithmetic unit 62 also calculates the position of the reference point in the machine coordinate system from the position of the reference point on the image and the present imaging magnification M.

(Eighth Modification)

The first to seventh modifications may be arbitrarily combined within a range in which no inconsistencies occur therein.

[Invention Obtained from Embodiments and Modifications]

The invention graspable from the embodiments and modifications above will be recited below.

(First Invention)

A first invention provides the information processing device (18) connected to a measurement device (16) and a numerical control device (14), the measurement device being provided in the vicinity of a machine tool (12) configured to machine a workpiece (W) using a tool (20), the numerical control device (14) being configured to control the machine tool (12). The information processing device (18) includes: a display unit (42) configured to display information; a first acquisition unit (50) configured to acquire, from the measurement device (16), measurement information measured by the measurement device (16); a second acquisition unit (52) configured to acquire, from the numerical control device (14), state information indicating a state of the machine tool (12); and a display control unit (54) configured to cause the display unit (42) to display the measurement information and the state information.

The above configuration makes it possible for an operator to check both the measurement information and state information on a single display screen. Thus, the operator is not forced to change the position of installation of at least one of the measurement device (16) and the numerical control device (14) for ease of checking both the measurement information and state information. This improves work efficiency.

The information processing device (18) may further include an arithmetic unit (60) configured to calculate control information for controlling the numerical control device (14), based on the measurement information. This allows the operator to check, on the display screen of the display unit (42), the state information obtained when the numerical control device (14) controls the machine tool (12) on the basis of the results (control information) automatically calculated by the arithmetic unit (60).

The measurement device (16) may include an imaging unit (16a) configured to capture an image of the tool (20) or the workpiece (W) at a specified imaging magnification (M), and the arithmetic unit (60) may be configured to, when the imaging magnification (M) is changed, calculate a movement command position (Pc) for the tool (20) or the workpiece (W) based on the imaging magnifications (M) before being changed and after being changed, in such a manner that a relative positional relationship between a specific point (Si) of the tool (20) or the workpiece (W) on the image captured by the imaging unit (16a) and an imaging center position (Ci) on the image is maintained before and after the imaging magnification (M) is changed.

Consequently, the relative positional relationship between the imaging center position (Ci) and the position of the specific point (Si) on the image can be maintained even when the imaging magnification (M) is changed. This prevents the specific point (Si) from falling outside the frame of the image even if the imaging magnification (M) is changed from a lower magnification to a higher magnification. Furthermore, since the relative positional relationship between the imaging center position (Ci) and the position of the specific point (Si) on the image is unchanged even when the imaging magnification (M) is changed, the operator can check the tool (20) more easily.

The information processing device (18) may further include a specific point setting unit (58) configured to set as the specific point (Si), an arbitrary point on the tool (20) or the workpiece (W) on the image, the arbitrary point being specified by an operator. Thus, an arbitrary point on the tool (20) or the workpiece (W) that the operator particularly desires to observe and check can be set as the specific point (Si).

The information processing device (18) may further include a specific point setting unit (58) configured to extract a predetermined feature point on the tool (20) or the workpiece (W) by analyzing the image, and to set the extracted feature point as the specific point (Si). The specific point (Si) can thus be automatically set without requiring the operator to manually specify the specific point (Si) on the tool (20) or the workpiece (W).

The arithmetic unit (60) may include a relative position calculating unit (60a) configured to calculate a relative positional relationship between the specific point (Sr) and the imaging center position (Cr) in a machine coordinate system, based on the imaging magnification (M) and a position of the specific point (Si) on the image, and the arithmetic unit (60) may be configured to, when the imaging magnification (M) is changed, calculate the movement command position (Pc) based on the calculated relative positional relationship in the machine coordinate system and the imaging magnifications (M) before being changed and after being changed. Thus, the movement command position (Pc) for moving the tool (20) or the workpiece (W) can be easily calculated, and the relative positional relationship between the specific point (Si) and the imaging center position (Ci) can be maintained even when the imaging magnification (M) is changed.

The relative positional relationship in the machine coordinate system may include a direction (D) of the specific point (Sr) as viewed from the imaging center position (Cr) in the machine coordinate system and a distance (Lr) between the imaging center position (Cr) and the specific point (Sr) in the machine coordinate system, and the arithmetic unit (60) may be configured to calculate the movement command position (Pc) in a manner so that the specific point (Sr) moves to a position of an intersecting point between the direction (D) and a circle having a radius of $Lr \times 1/\alpha$ from the imaging center position (Cr) in the machine coordinate system, where $\alpha$ denotes a ratio of the imaging magnification (M) after being changed to the imaging magnification (M) before being changed, and Lr denotes the distance. The movement command position (Pc) for moving the tool (20) or the workpiece (W) can thus be calculated easily.

The imaging unit (16a) may be configured to capture the image of the tool (20) or the workpiece (W) from a direction that intersects a plane defined by a first direction in which the tool (20) or the workpiece (W) axially moves and a second direction perpendicular to the first direction. The tool (20) or the workpiece (W) can thus be axially moved along the plane. Furthermore, since the imaging unit (16a) captures images of the tool (20) or the workpiece (W) from a direction that intersects the plane defined by the first direction and the second direction, the state of the axial movement of the tool (20) or the workpiece (W) can be imaged in a preferable manner.

(Second Invention)

A second invention provides an information processing method for an information processing device (18) that is connected to a measurement device (16) and a numerical control device (14), the measurement device being provided in the vicinity of a machine tool (12) configured to machine a workpiece (W) using a tool (20), the numerical control device (14) being configured to control the machine tool (12). The information processing method includes: an acquisition step (S3) of acquiring, from the measurement device (16), measurement information measured by the measurement device (16), and acquiring, from the numerical control device (14), state information indicating a state of the machine tool (12); and a display step (S4) of causing a display unit (42) to display the measurement information and the state information.

Owing thereto, an operator can check both the measurement information and state information on a single display screen. Thus, the operator is not forced to change the position of installation of at least one of the measurement device (16) and numerical control device (14) for ease of checking both the measurement information and state information. This improves work efficiency.

The information processing method may further include an arithmetic step (S18) of calculating control information for controlling the numerical control device (14), based on the measurement information. This allows the operator to check, on the display screen of the display unit (42), the state information obtained when the numerical control device (14) controls the machine tool (12) on the basis of the results (control information) automatically calculated at the arithmetic step (S18).

The measurement device (16) may include an imaging unit (16a) configured to capture an image of the tool (20) or the workpiece (W) at a specified imaging magnification (M), and when the imaging magnification (M) is changed, the arithmetic step (S18) may calculate a movement command position (Pc) for the tool (20) or the workpiece (W) based on the imaging magnifications (M) before being changed and after being changed, in such a manner that a relative positional relationship between a specific point (Si) of the tool (20) or the workpiece (W) on the image captured by the imaging unit (16a) and an imaging center position (Ci) on the image is maintained before and after the imaging magnification (M) is changed.

Consequently, the relative positional relationship between the imaging center position (Ci) and the position of the specific point (Si) on the image can be maintained even when the imaging magnification (M) is changed. This prevents the specific point (Si) from falling outside the frame of the image even if the imaging magnification (M) is changed from a lower magnification to a higher magnification. Furthermore, since the relative positional relationship between the imaging center position (Ci) and the position of the specific point (Si) on the image is unchanged even when the imaging magnification (M) is changed, the operator can check the tool (20) more easily.

The information processing method may further include a specific point setting step (S14) of setting as the specific point (Si), an arbitrary point on the tool (20) or the workpiece (W) on the image, the arbitrary point being specified by an operator. Thus, an arbitrary point of the tool (20) or the workpiece (W) that the operator particularly desires to observe and check can be set as the specific point (Si).

The information processing method may further include a specific point setting step (S14) of extracting a predetermined feature point on the tool (20) or the workpiece (W) by analyzing the image, and setting the extracted feature point as the specific point (Si). The specific point (Si) can thus be automatically set without requiring the operator to manually specify the specific point (Si) on the tool (20) or the workpiece (W).

The information processing method may further include a relative position calculating step (S15) of calculating a relative positional relationship between the specific point (Sr) and the imaging center position (Cr) in a machine coordinate system, based on the imaging magnification (M) and a position of the specific point (Si) on the image, and, when the imaging magnification (M) is changed, the arithmetic step (S18) may calculate the movement command position (Pc) based on the calculated relative positional relationship in the machine coordinate system and the imaging magnifications (M) before being changed and after being changed. Thus, the movement command position (Pc) for moving the tool (20) or the workpiece (W) can be easily calculated, and the relative positional relationship between the specific point (Si) and the imaging center position (Ci) can be maintained even when the imaging magnification (M) is changed.

The relative positional relationship in the machine coordinate system may include a direction (D) of the specific point (Sr) as viewed from the imaging center position (Cr) in the machine coordinate system and a distance (Lr) between the imaging center position (Cr) and the specific point (Sr) in the machine coordinate system, and the arithmetic step (S18) may calculate the movement command position (Pc) in a manner so that the specific point (Sr) moves to a position of an intersecting point between the direction (D) and a circle having a radius of $Lr \times 1/\alpha$ from the imaging center position (Cr) in the machine coordinate system, where $\alpha$ denotes a ratio of the imaging magnification (M) after being changed to the imaging magnification (M) before being changed, and Lr denotes the distance. The movement command position (Pc) for moving the tool (20) or the workpiece (W) can thus be calculated easily.

The present invention is not particularly limited to the embodiments described above, and various modifications are possible without departing from the essence and gist of the present invention.

What is claimed is:

1. An information processing device that is connected to a measurement device and a numerical control device, the measurement device being provided in a vicinity of a machine tool configured to machine a workpiece using a tool, the numerical control device being configured to control the machine tool, the information processing device comprising:
   a display unit configured to display information;
   a first acquisition unit configured to acquire, from the measurement device, measurement information measured by the measurement device including an image of the tool;
   a second acquisition unit configured to acquire, from the numerical control device, state information indicating a state of the machine tool; and
   a display control unit configured to cause the display unit to simultaneously display the measurement information and the state information,
   wherein the image of the tool is displayed with respect to a coordinate axis of the image,
   wherein an origin of the coordinate axis corresponds to a center of the image,
   wherein the state information of the tool based on the coordinate axis is displayed on the image, and
   wherein the display is maintained on the display unit of a relative positional relationship between an imaging center position of the image corresponding to the origin of the coordinate axis and a position of a point on the tool as a magnification of the image is changed.

2. The information processing device according to claim 1, further comprising an arithmetic unit configured to calculate control information for controlling the numerical control device, based on the measurement information,
   wherein:
   the measurement device includes an imaging unit configured to capture the image of the tool at a specified imaging magnification; and
   the arithmetic unit is configured to, when the imaging magnification is changed, calculate a movement command position for the tool based on the imaging magnifications before being changed and after being changed, in a manner that the relative positional relationship between the position of the point of the tool on the image captured by the imaging unit and the imaging center position on the image is maintained before and after the imaging magnification is changed.

3. The information processing device according to claim 1, wherein the state information of the tool includes machine coordinates of the tool with respect to the coordinate axis, and
   wherein the machine coordinates of the tool are displayed on the image.

4. An information processing method for an information processing device that is connected to a measurement device and a numerical control device, the measurement device being provided in a vicinity of a machine tool configured to machine a workpiece using a tool, the numerical control device being configured to control the machine tool, the information processing method comprising:
   acquiring, from the measurement device, measurement information including an image of the tool;
   acquiring, from the numerical control device, state information indicating a state of the machine tool; and
   a display step of causing a display unit to simultaneously display the measurement information and the state information,
   wherein the image of the tool is displayed with respect to a coordinate axis of the image,
   wherein an origin of the coordinate axis corresponds to a center of the image,
   wherein the state information of the tool based on the coordinate axis is displayed on the image, and
   wherein, as a magnification of the image is changed, the display step maintains the display of a relative positional relationship between an imaging center position of the image corresponding to the origin of the coordinate axis and a position of a point on the tool.

5. An information processing device that is connected to a measurement device and a numerical control device, the measurement device being provided in a vicinity of a machine tool configured to machine a workpiece using a tool, the numerical control device being configured to control the machine tool, the information processing device comprising:
   a display unit configured to display information;
   circuitry configured to:
   acquire, from the measurement device, measurement information measured by the measurement device including an image of the tool;
   acquire, from the numerical control device, state information indicating a state of the machine tool; and
   cause the display unit to simultaneously display the measurement information and the state information,
   wherein the image of the tool is displayed with respect to a coordinate axis of the image, wherein an origin of the coordinate axis corresponds to a center of the image, wherein the state information of the tool based on the coordinate axis is displayed on the image, and wherein the display is maintained on the display unit of a relative positional relationship between an imaging center position of the image corresponding to the origin of the coordinate axis and a position of a point on the tool as a magnification of the image is changed.

* * * * *